United States Patent [19]

Sorokin

[11] Patent Number: 5,562,809
[45] Date of Patent: Oct. 8, 1996

[54] METHOD FOR MAKING HYDROGEN SATURATED METAL COMPOUNDS

[75] Inventor: Lev M. Sorokin, Moscow, Russian Federation

[73] Assignee: Plasma Plus, Van Nuys, Calif.

[21] Appl. No.: 380,192

[22] Filed: Jan. 30, 1995

Related U.S. Application Data

[63] Continuation of Ser. No. 7,606, Jan. 22, 1993, abandoned.

[51] Int. Cl.$^6$ ........................................................ H05F 3/00
[52] U.S. Cl. .......................................... 204/164; 423/644
[58] Field of Search ............................. 423/644; 204/164

[56] References Cited

U.S. PATENT DOCUMENTS

| | | | |
|---|---|---|---|
| 3,409,403 | 11/1968 | Bjornson et al. | 423/450 |
| 3,431,074 | 3/1969 | Jordan | 423/450 |
| 3,848,068 | 11/1974 | Rice | 204/164 |
| 4,610,857 | 9/1986 | Ogawa et al. | 423/636 |
| 4,728,507 | 3/1988 | worcester | 204/164 |

FOREIGN PATENT DOCUMENTS

| | | | |
|---|---|---|---|
| 2116943 | 6/1972 | France | 423/644 |
| 31302 | 2/1986 | Japan | 423/644 |
| 162884 | 7/1988 | Japan | 423/644 |

OTHER PUBLICATIONS

Webster's *New Collegiate Dictionary* (1979), G. & C. Merriam Comapny, p. 939.
Encyclopedia of Chemistry: Soviet Encyclopedia, 1988, vol. 1, pp. 1080–1081, Aluminum, Aluminum Hydride.
Baznowski B., Tkacz M. The Equilibrium Between Solid Aluminum Hydride and Gaseous Hydrogen // Zeitschzift fur Phsikelische Chemie Neue Folge, Bd. 135, S. 27–38 (1983).
Siegel B., The Reaction Between Aluminum and Atomic Hydrogen // Journal of American Chem. Soc. 1960, V.82, N7, pp. 1535–1537.
Ludvig R., Michlitz H. Metal–Non–Metal Transition and Superconductivity in Frozen Aluminum–Hydrogen Films// Solid State Communs, 1984, V. 19, pp. 519–521.
Normotov I.S., Alexandrov A.P., Petinov V.I., Microstructure and Electric Conductivity of High–Dispersed Films of Nickel Hydride, News of Academy of Sciences of USSR, Series—Physics, 1986, vol. 50, #8, pp. 1653–1656.
Larikov, L. N., Kranilnikov B. S., Anomal Penetration of Argon into Aluminum during combined Bombardment of Its Surface by Argon and Hydrogen Ions; Preprint 79.9—Kiev: Institute of Metallophysics of Academy of Sciences of Ukraine, 1979, p. 1932. (the same [7]).
Krasilnikov V. S., Larikov L. N., Research On Peculiarities of Gas Distribution in Metals. subjected to combined Bombardment by Hydrogen and Inert Gas Ions// In the Book "Diagnosis of the Surface by Ion Beams", Donetsk: High School, 1980, pp. 203–204.
Sorokin L. M., "Chemical Metallurgoical Processes Based on High–Frequency Techniques"// In book Low–Temperature Plasma, Novosibirsk, Siberia Branch of Academy of Sciences of Russia, 1992, vol. 8, pp. 204–246.

(List continued on next page.)

*Primary Examiner*—Wayne Langel
*Attorney, Agent, or Firm*—Natan Epstein

[57] ABSTRACT

A method for making metastable compounds of Me metal, argon and hydrogen, comprising the steps of generating a high frequency plasma discharge in a flow of hydrogen-argon gas mixture, the plasma discharge having a higher temperature plasma generating active region and producing a flow of plasma downstream of the plasma discharge; establishing a zone of substantially zero axial flow of the mixture within the active region of the plasma discharge relative to the flow of plasma immediately downstream of the generating means; introducing finely powdered Me metal into or near the zone and within the active region at a rate conducive to evaporation of the metal in the plasma discharge; rapidly cooling the reaction products resulting from interaction of the Me metal with the plasma to precipitate a solid component; and passivating the surface of the solid component.

22 Claims, 4 Drawing Sheets

OTHER PUBLICATIONS

Sorokin L. M. Evaluation of power of ultra-dispersed substance type Al*nAr// Journal of Physic and Chem. Treat. of Materials, 1991, v.1, pp. 136–138.

Tananayev I.V., Fedorov V. B., Malukova L. V., Korobov Y. A., Kapitanov E. V, Characteristic Features of Ultradispersed medium // Reports of USSR Academy of science, issued in 1985, vol. 283, No. 6 Physics.

METHOD FOR MAKING HYDROGEN SATURATED METAL COMPOUNDS

This is a continuation of application Ser. No. 08/007,606 filed on Jan. 22, 1993, abandoned.

BACKGROUND OF THE INVENTION

1. Field of the Invention

This invention relates to the manufacture of hydrogen saturated metallic compounds of enhanced stability and improved calorific yield.

2. State of the Prior Art

Active metal powders are widely used as combustible materials, in the manufacture of solid rocket fuels, explosives, and as high-energy additives to fuels such as gasoline, kerosene, diesel fuel etc. An example is aluminum powder with a specific calorific value of 7,390 kcal/kg. Efforts have been made to increase this calorific yield (bracketed numerals below refer to similarly numbered publications in the attached listing References). Classic chemical methods have led to hydride type compounds with high calorific value. For instance [1]:

$$3Li\ AlH_4 + AlCl_3 = 3LiCl + 4AlH_3$$

The result is aluminum hydride with a calorific yield of about 9,500 Kcal/kg, widely used in production of solid rocket fuels. A drawback of these conventional materials is their low stability when exposed to atmospheric air. Also, these materials suffer from poor temperature stability, tending to dissociate at temperatures above 105° C., and the cost of their industrial production is high. More stable hydrogenated metal compounds of higher calorific value are needed.

In past efforts to overcome these drawbacks, various physico-chemical methods have been applied in the manufacture of metal hydrides. Molecular hydrogen has been combined with aluminum. This however, requires high pressures, about 10 kilobars, making industrial production complicated and costly [2]. Activated hydrogen, in its monoatomic state, is more promising, resulting in hydrogen-saturated aluminum [3]. It has been shown experimentally that aluminum vapor condensed onto a low temperature base can absorb large quantities of monoatomic hydrogen [5]. While this method resulted in high energy solid combustible material, the resulting product was synthesized in thin films at 77° Kelvin, and dissociated at higher temperatures.

Efforts have also been made to introduce monoatomic hydrogen together with argon into aluminum [6]. Bombardment of an aluminum surface with argon and hydrogen ions resulted in a more stable product, which however was formed as a 10 micron layer on a low temperature base, and removal of this thin layer was not practical for industrial production [7].

Currently known is a method for making metal hydrides characterized by heating, partial dissociation and partial ionization of hydrogen and introduction of activated hydrogen with argon into an aluminum surface, with subsequent fixation of the introduced gases by cooling of the aluminum to a temperature below 77° K. The shortcoming of this method is that once the temperature increases, the compound dissociates and hydrogen separates from the metal.

A continuing need exists for a process by which hydrogenated metal compounds can be made with enhanced stability in contact with atmospheric air and at temperatures above 105° C.

SUMMARY OF THE INVENTION

The present invention provides a method for making substances characterized by the general formula Me.nAr.mH having enhanced stability and a calorific yield greater than 9,500 kcal/kg. Generally, this objective is achieved by evaporating a powdered metal Me, which may be selected from among beryllium, aluminum and magnesium, in an argon-hydrogen plasma medium; precipitating a solid material resulting from interaction of the metal vapor with the argon-hydrogen plasma; cooling the interaction products at a rate greater than $10^{5°}$ C. per second; passivating the surface of the solidified interaction product; and collecting the solid interaction product in its fixed metastable state.

In a presently preferred form of the invention, the powdered metal is introduced into the plasma discharge in a flow of carrier argon gas. The plasma discharge is generated in a reactor chamber having a longitudinal axis between an inlet end and an outlet end, and a plasmogenic argon-hydrogen mixture circulates in the reactor chamber in a reciprocal flow pattern with a zone of substantially zero axial flow of the mixture in the chamber. The powdered metal is preferably fed into the plasma discharge in or near this zone at a rate such that the Me metal evaporates completely in the plasma discharge. The plasma flow downstream of the plasma discharge is subjected to rapid cooling, at a rate of at least $10^5$ degrees Centigrade/second, which causes precipitation of a solid component of the reaction products in the form of a fine powder or dust, consisting of the hydrogenated Me metal with ballast argon. The solid product is passivated, such as by exposure to hydrogen gas or hydrogen containing fluid.

The method of this invention may be carried out in an apparatus which includes a high-frequency plasmatron of either the induction or capacitative type for generating a plasma discharge in a hydrogen-argon gas mixture. A swirler mounted at an inlet end of the plasma chamber introduces the plasmogenic gas and creates the reciprocal flow pattern with the zone of substantially zero axial flow of the plasmogenic gas in the chamber. A probe inserted in the plasma chamber of the plasmatron introduces the finely powdered Me metal into a selected zone of the plasma discharge. A tempering unit is mounted for rapidly cooling the reaction products downstream of the plasma discharge. A passivating unit may be combined with or provided separately downstream of the tempering unit for passivating said solid reaction products. The tempering unit may take various forms. In a first form, the tempering unit injects a coolant fluid into the plasma flow downstream of the plasma discharge. In a second form the tempering unit is an expansion nozzle mounted at an outlet end of the plasma chamber. In a third form the tempering unit includes a cold surface disposed for collecting solid reaction products flowing from the outlet end of the reaction chamber. The third form of the tempering unit may also be combined with either the first or second forms.

These and other features and advantages of the improved method and apparatus for practicing the same will be better understood from the following detailed description taken with reference to the accompanying drawings.

DETAILED DESCRIPTION OF THE PREFERRED EMBODIMENTS

Figure 1:
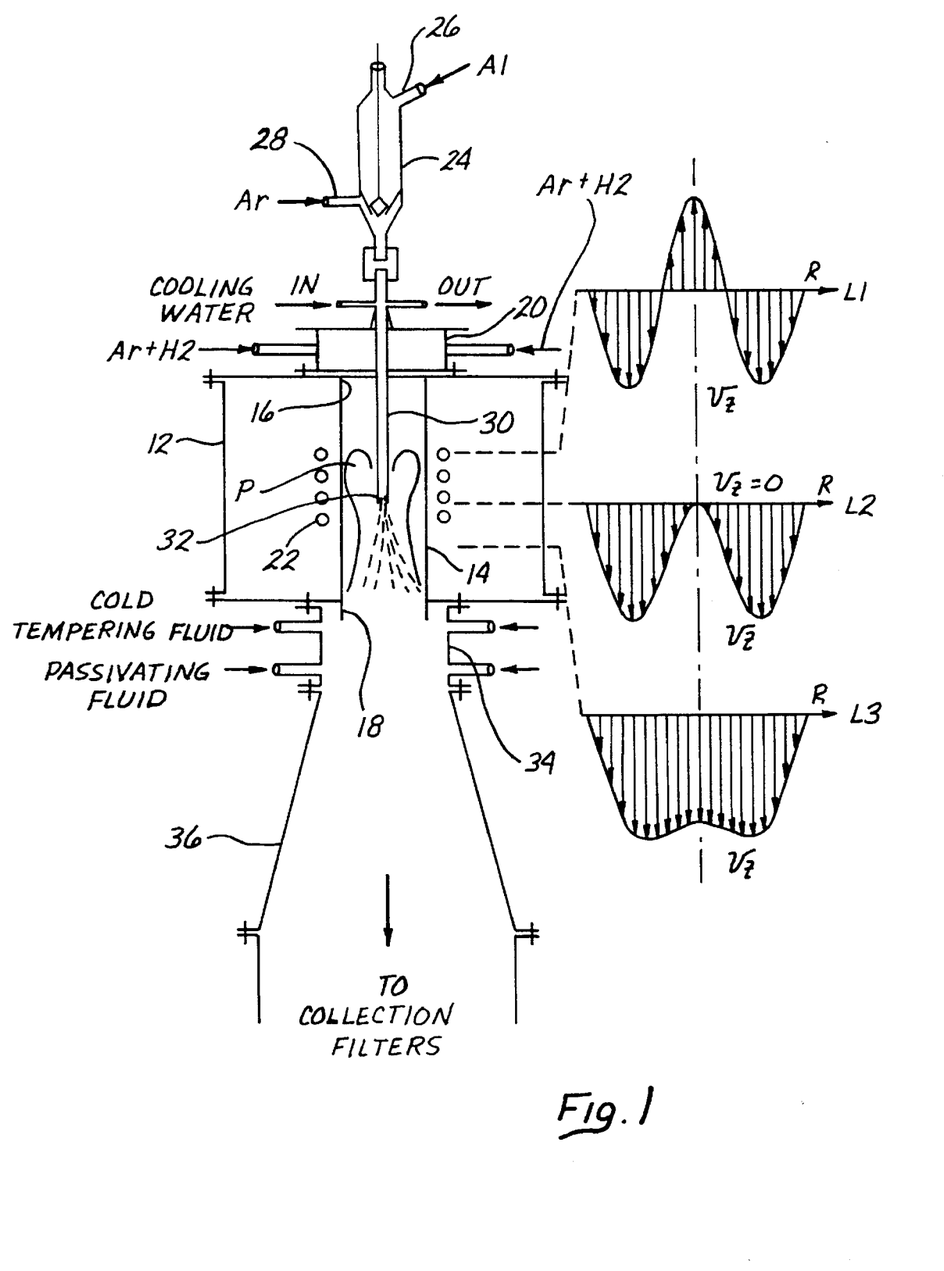
FIG. 1 is a schematic elevational cross section of a first form of the apparatus employed according to the method of this invention for making metastable Me—Ar—H compounds.

With reference to the drawings, FIG. 1 shows a HFI (High Frequency Inductive) plasmatron 12 which has a cylindrical plasma chamber 14 with an inlet end 16 at the top and a lower outlet end 18. An induction coil 22 wound about the chamber 14 is powered by a suitable high frequency source for generating a plasma discharge in chamber 14. A swirler 20 is mounted at the top 16 of the plasma chamber for introducing a mixture of argon and hydrogen gas into the plasma discharge chamber 14 at atmospheric pressure. A hopper-type flow metering dispenser 24 feeds aluminum powder from inlet 26 at an adjustable rate into a stream of carrier argon gas from inlet 28. The argon borne aluminum is introduced into the HFI plasma discharge P through a probe 30 mounted axially in the plasma discharge chamber 14. The probe 30 has a protective water-cooled jacket and terminates in a nozzle opening 32 at it lower end. Probe 30 is positioned with nozzle 30 near the top of the plasma discharge P. The powdered aluminum is heated and evaporates in the plasma discharge P, and the resultant metallic vapor interacts with the mixture of hydrogen and argon ions and atoms constituting the plasma medium. The products of this reaction flow out of the chamber 14 through its open lower end 18. A tempering/passivating unit 34 is mounted downstream of chamber 14 and is constructed for supplying both a cold fluid and a passivating agent, which may be one and the same, into the path of the reaction products flowing from the reaction chamber 14. The unit 34 may for example have one or more coils with spaced holes for injecting cold fluid into the reaction product stream. As the gaseous stream flows downwardly from the reaction chamber 14 into the cold fluid supplied by the tempering unit 34, a solid component of the reaction products precipitates as a fine powder in the gas stream. Tempering or hardening occurs through rapid cooling of the solid component of the reaction products upon contact with the cold fluid. Passivation of the particle surface of the solid component results from action of the passivating agent on the solid precipitate. Following cooling and passivation, the resulting dust-gas mixture passes into an expansion/heat exchanger stage 36 and then through a filtering assembly (not shown) where the solid reaction product is separated from the gas stream and collected on glass fiber filters.

EXAMPLE 1

With reference to FIG. 1, a plasma discharge chamber 14 having an inside diameter of 45 millimeters was provided. High-frequency high-voltage power at a frequency of 13.56 MHz with an input power of 16 kW was supplied to the inductive coil 22 of the HFI-plasmatron 12. Argon was introduced into chamber 14 through swirler 20 and an HFI-plasma discharge was excited, in a conventional manner. Plasma generating argon flow into the discharge chamber 14 through swirler 20 was established at a rate of between 1 and 4 cubic meters/hour, and a stable operating regime of the high frequency generator powering the plasmatron 1 is maintained. Hydrogen gas was introduced into swirler 20 and there mixed with the argon gas. Hydrogen gas concentration in the plasma generating argon gas flow was maintained at not less than 10%. Swirler 20 introduces the plasma generating hydrogen-argon gas mixture tangentially into chamber 14 and a reciprocal flow pattern is established in the discharge chamber 14. FIG. 1 shows the reciprocal flow pattern at three axially spaced cross-sectional plots L1, L2 and L3 in the chamber 14. The horizontal axis R of each plot represents radial distance from the center axis of chamber 14 while the vertical axis $V_z$ represents direction and magnitude of gas flow. As seen in plot L2, a zone exists along the center axis of chamber 14 where axial gas flow $V_z$ is substantially zero. Using a micromanometer, the location of the reciprocating flow point $V_z=0$ was established, and the water cooled probe 30 was lowered into the HFI-discharge P such that the probe nozzle opening 32 is positioned in the flow of plasma generating gas slightly below point $V_z=0$ of the flow pattern. The axial gas flow above this point is upwardly, as shown in plot L1. The apparatus is arranged so that point $V_z=0$ of the flow pattern lies in the high temperature or active zone of the plasma discharge. Therefore, the nozzle opening 32 is placed slightly below this point in the relatively static flow region at or near $V_z=0$ where the aluminum powder will tend to reside longer in the hot, active region of the plasma discharge. Gas input to swirler 20 was 2 cubic meters/hour of argon and 1 cubic meter/hour of hydrogen. Aluminum powder was fed from metering dispenser 24 through the water cooled probe 30 into the center of the HFI-plasma discharge in a stream of carrier argon gas, the flow of which did not exceed 0.1 cubic meters per hour. The plasma discharge may be maintained and stabilized by increasing the hydrogen concentration in the plasma-generating gas mixture by either increasing hydrogen flow to 1.2 cubic meters/hour or decreasing argon flow to 1.8 cubic meters/hour in swirler 20. The aluminum powder enters the active zone of the HFI-discharge where it is subjected to temperatures in the order of 2,000 degrees C. and completely evaporates. The particle size of the aluminum powder fed into the plasma discharge was selected such that, taking into account the power input to the plasma discharge and the dwell time of the powder in the plasma discharge, the powder evaporates completely. The dwell time of the aluminum powder in the plasma discharge can be calculated by means of the following expression, which is discussed and explained in reference [8] of the attached list, which also provides additional information concerning behavior of powders in plasma:

$$\tau_v = \frac{(\epsilon+1)r_{po}\rho_p}{P} \left[ \frac{r_{po}RT}{3.5DM} \left[ \frac{1-r^2}{2} - \frac{1-r^5}{5(1+\epsilon^{-1})} \right] + \left[ 1-r - \frac{1-r^4}{4(1+\epsilon^{-1})} \right] \left[ \frac{2\pi RTG}{Mv\alpha_n^2} \right]^{1/2} \right]$$

In this particular example, aluminum particles of 1 micron in size fed at a rate of between 1 to 2 grams/minute evaporated in $10^{-5}$ seconds in the plasma discharge P. Evaporation of aluminum powder commenced in the HFI-discharge P itself and was completed in the flow of plasma downstream of the discharge P proper. The tempering unit 34 is mounted at this very point of the flow path just downstream of the point where evaporation of the aluminum powder is completed. The unit 34 combines the tempering and passivating functions by supplying hydrogen or a hydrogen containing fluid, at generally room temperature, such as a hydrocarbon in gaseous or liquid state, at a relatively high flow rate, such as not less than five times the flow rate of the hydrogen-argon plasmogenic mixture into the plasma chamber 14. Tempering unit 34 cools the products of the plasma interaction at a rate not lesser than $10^5$ degrees C. per second. This rapid cooling fixes monoatomic hydrogen on aluminum particles at an incipient stage of nucleation of the condensing metal and interrupts the growth of the condensing aluminum. An advantageous size of the condensed particles is about 30 to 40 Angstrom. Simultaneously with this tempering, the reaction products are passivated by contact with the hydrogen or hydrogen containing gas (or liquid) introduced by unit 34 into the dust-gas reaction product stream. The dust-gas flow is then further cooled in heat exchanger 36, and the solid component of the reaction products is collected on suitable filters (not shown in the drawings) arranged at a downstream location. The heat exchanger 36 may have an outer water jacket and/or cooling coils arranged in the gas stream.

As a result of the evaporation-interaction-hardening-passivation sequence, metastable material characterized by the general formula Al.nAr.mH is obtained. Analysis of the solid material showed the coefficients n=0.065 and m=3. The calorific yield of the solid material obtained by this process was found to be 13,480 kcal/kg. The material obtained was found to be more stable in contact with atmospheric air than aluminum hydride obtained by previously known processes, and its thermal dissociation did not occur at a temperature lower than 200° C.

Theoretical considerations indicate that the content of monoatomic hydrogen captured and retained by the aluminum particles by the process of this invention can be increased above m=3. Based on existing knowledge of dissolution of monoatomic hydrogen in amorphous media, the quantity of retained monoatomic hydrogen may reach m=6.7 in which case the gross-formula of the composition is Al.0.065Ar.6.7H, with a calculated caloric yield equal to 21,000–22,000 kcal/kg. Such Al.nAr.mH compositions, where m>3, represent a new, presently unknown class of substances. One objective of the method of this invention is to increase the quantity of monoatomic hydrogen captured and retained by the aluminum particle in relation to the quantity of argon captured by the particle [8].

EXAMPLE 2

Figure 2:
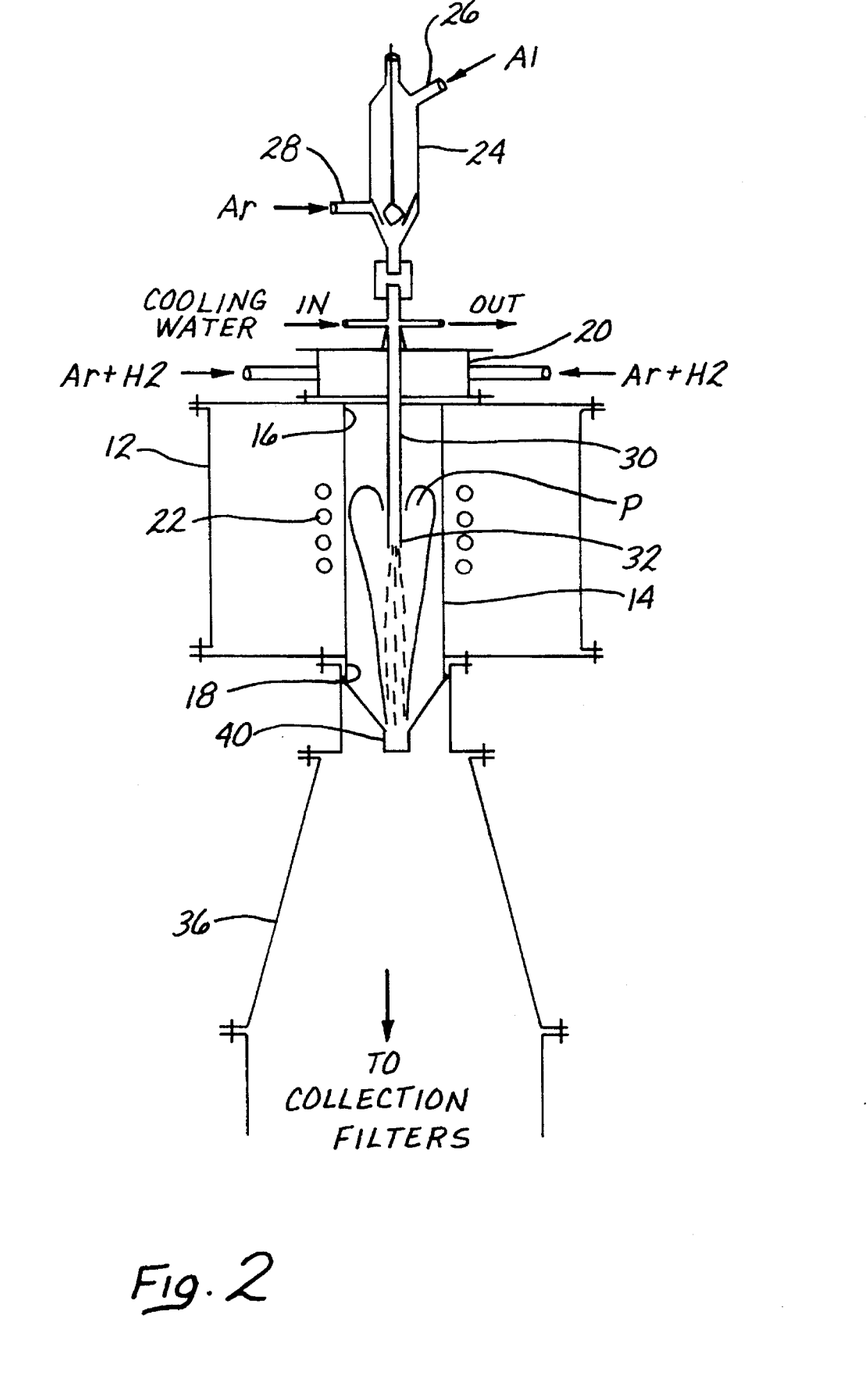
FIG. 2 shows a second embodiment of the apparatus of FIG. 1.

With reference to FIG. 2 of the drawings, the apparatus was set up as in Example 1. An HFI-discharge was excited in chamber 14 of plasmatron 12, and a plasma generating gas mixture of 1.8 Cu.m./hr. or argon and 1.2 Cu.m./hr. hydrogen supplied through swirler 20 was excited with 16 KW of input power to coil 22. The apparatus of FIG. 2 differs from that of FIG. 1 in the method of cooling the plasma reaction products to achieve tempering. The tempering unit 34 of FIG. 1 is replaced by an expansion nozzle 40, which preferably is a Laval type expansion nozzle with a minimum internal nozzle diameter of 4 mm. Below the nozzle 40, in the expansion/heat exchanger unit 36, a partial vacuum is established sufficient to achieve a flow velocity in excess of Mach 1 of the dust-gas mixture through the nozzle 40. The supersonic flow through the expansion nozzle 40 results in a cooling rate of the dust-gas mixture of the order of $10^{6°}$ C./sec. The cooled material was then directed through filters where the solid dust component was separated and collected.

The solid material obtained was found to have the composition Al.0.065.Ar.4.5H, and to be stable over a substantial period of time, of at least several dozen hours. The calorific power of the compound with this gross formula was calculated to be 16,000 kcal/kg. When heated without direct contact with atmospheric air, noticeable separation of hydrogen from the compound commenced only after the material reached a temperature of 180° C.

EXAMPLE 3

Figure 3:
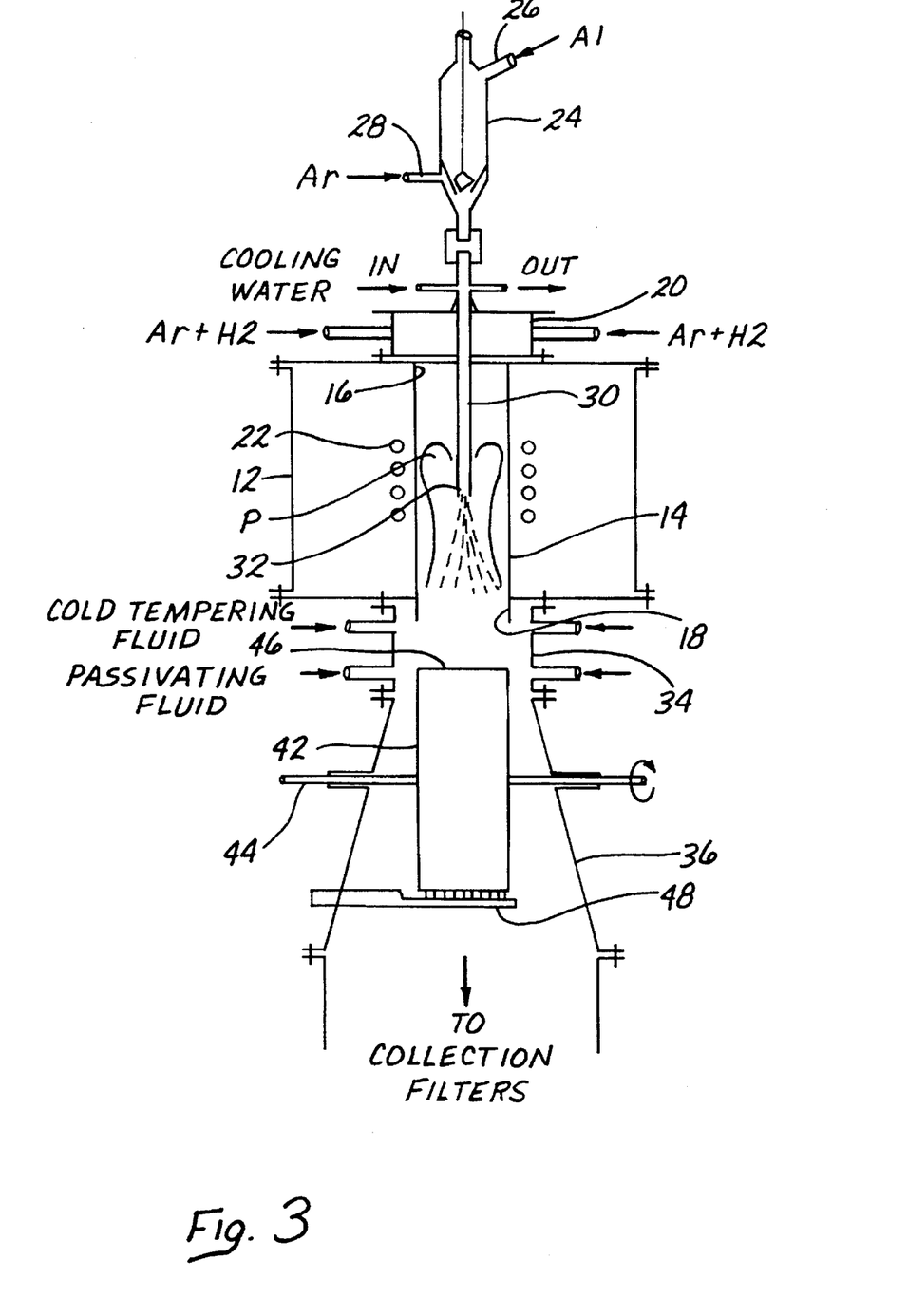
FIG. 3 shows a third embodiment of the apparatus of FIG. 1.
Figure 4:
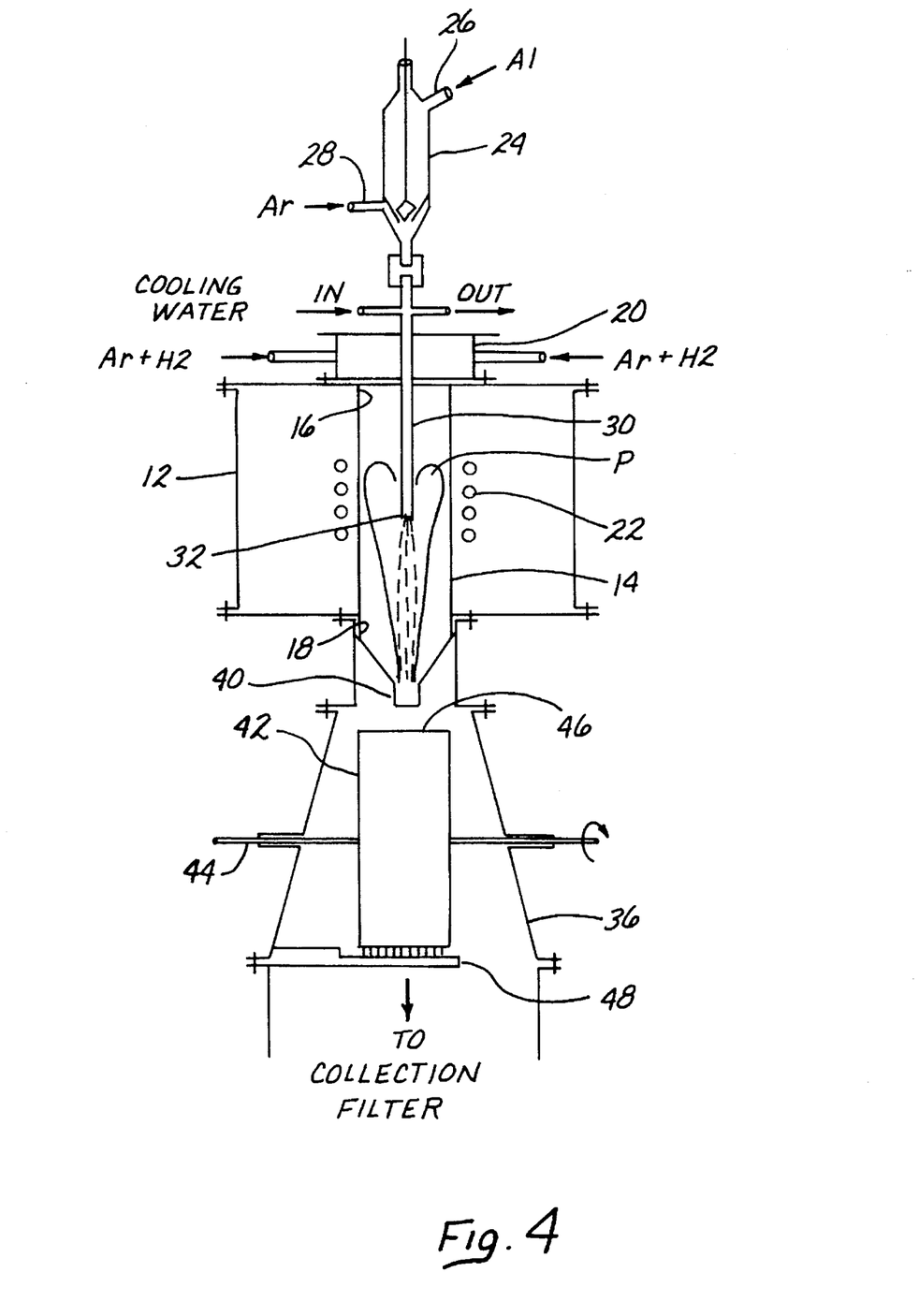
FIG. 4 shows a fourth embodiment of the apparatus of FIG. 1.

With reference to FIGS. 3 and 4, the apparatus of FIGS. 1 and 2 respectively was modified by providing a rotating drum 42 turning on horizontal axle 44. The drum 42 has a polished metallic outer radial surface 46 which is cooled by liquid nitrogen or liquid air inside the drum. A scraper 48 is mounted for continuously sweeping the radial surface 46 of the drum in order to collect solid material precipitating onto the surface from the reactor chamber 14. In FIG. 3, the apparatus arrangement is similar to that described in connection with FIG. 1, with the combined tempering/passivating unit 34 interposed between the reactor chamber 14 and the drum 42. In FIG. 4, the apparatus is similar to that of FIG. 2, with the addition of the rotating drum 42 underneath the expansion nozzle 40, such that the expanding dust-gas mixture is directed by the nozzle onto the rotating drum surface 46.

The material scraped off the drum 42 was then directed onto glass-fiber filter elements for collection. The gross composition of the solid product obtained was found to be Al.0.065Ar.6.7H. The calorific power of this material was found to be 20,000 kcal/kg, according to the following calculation:

$$2(Al \cdot 0.065Ar \cdot 6.7H) + 9.7O_2 =$$

$$Al_2O_3 + 6.7(H_2O + Q_4) + 6.7Q_3 + \dot{Q}_1 - Q_c$$

$$M = 72.6$$

$$Q_1 = \frac{399.1}{72.6} = 5.5 \frac{kcal}{g}$$

$$6.7 \cdot Q_3 = \frac{6.7 \cdot 104.1}{72.6} = 9.6 \frac{kcal}{g}$$

$$\sum_{h=1}^{y-1} Q = 19.88 \frac{kcal}{g} \approx 20,000 \frac{kcal}{Kg}$$

$$6.7 \cdot Q_1 = \frac{6.7 \cdot 57.8}{72.6} = 5.33 \frac{kcal}{g}$$

$$Q_2 = 0$$

$$Q_c = 40 \frac{kcal}{M} = 0.5 \frac{kcal}{g}$$

$Q_c$—substance binding energy
$Q_1$—aluminum combustion
$Q_2$—energy of crystal grid=O
$Q_3$—recombination energy H+H=H$_2$+Q$_2$
Qsub4—energy of combustion of hydrogen molecules into water vapor The high calorific power of the reaction product of Example 3 is promoted by the very rapid hardening by cooling, at a rate of not less than $10^{7°}$ C./sec, of the solid component of the dust-gas flow expanding from nozzle 40 on the cold surface 46 of drum 42.

As a result of this method, a metastable composition of aluminum with monoatomic hydrogen and ballast argon was obtained having a calorific power of about 20,000 kcal/kg, which high calorific yield is due to super-equilibrium quantities of monoatomic hydrogen bound to the aluminum. In the case of conventional crystalline aluminum and crystalline aluminum hydride, the quantity of monoatomic hydrogen captured and retained by the aluminum is limited by quantum-mechanical restrictions. Those restrictions do not apply however to ultradispersed cluster aluminum in its amorphous metastable state. This is why the "m" coefficient of hydrogen in the compound composition can substantially exceed the conventional limit value of m=3, which is typical for any classic substance, such as aluminum hydride $AlH_3$.

The substances obtained in this manner, with hydrogen content coefficient m>3 fall outside of known classical theory, but are readily explained in terms of non-equilibrium thermal dynamics and plasma non-equilibrium processes. These novel substances supersede known aluminum hydrate in calorific power and also have superior temperature stability in that hydrogen loss begins at temperatures above 150° C.

The inductive type plasmatron 12 employed in the foregoing examples and shown in FIGS. 1 through 4 may be replaced with a capacitative type high frequency plasmatron. In such case, the flow of carrier argon gas through 24 may be reduced over the flow used in the inductive plasmatron 12, due to the somewhat different characteristics of the capacitative plasma discharge. The position of the $V_z=0$ zone can be displaced along the axis of the chamber 14 by altering the proportion of argon to hydrogen input to the swirler 20. A larger proportion of argon raises the position of the $V_z=0$ zone relative to the plasma discharge P in the reactor chamber 14. This results in a longer dwell time of the aluminum powder in the hot plasma discharge, and therefore more time for the aluminum to evaporate and interact with the gas plasma. However, the greater flow of argon requires a reduction in hydrogen flow into the swirler 20, in order to maintain total plasmogenic gas flow into the chamber 14 constant, at 3 Cu.m./hr. for the particular apparatus employed in the Examples above. The greater argon/hydrogen ratio in the plasma results in a larger proportion of argon to hydrogen in the Al.nAr.mH compositions obtained, i.e. the n coefficient is increased at the expense of the m coefficient. An optimal position of the nozzle 32 can be found relative to the plasma discharge P at which maximum throughput of the process is achieved and hydrogen content in the resulting product is maximized.

What is claimed is:

1. A method for making metastable compounds of Me metal, argon and hydrogen, comprising the steps of:

generating a high frequency plasma discharge in a flow of hydrogen-argon gas mixture, said plasma discharge having a higher temperature plasma generating active region and producing a flow of plasma downstream of said plasma discharge;

establishing a zone of substantially zero axial flow of said mixture within said active region of said plasma discharge relative to said flow of plasma immediately downstream of said generating means;

introducing finely powdered Me metal into or near said zone and within said active region at a rate conducive to evaporation of said metal in said plasma discharge;

rapidly cooling the reaction products resulting from interaction of said Me metal with said plasma at a rate of at least $10^5$ degrees centigrade/second to precipitate a solid component; and passivating the surface of said solid component.

2. The method of claim 1 wherein said Me metal is selected from the group consisting of beryllium, aluminum and magnesium.

3. The method of claim 1 wherein said powdered Me metal is carried into said plasma in a flow of carrier gas.

4. The method of claim 3 wherein said carrier gas is Argon gas.

5. The method of claim 1 wherein said passivating step comprises exposure of said solid component to hydrogen gas or hydrogen containing fluid.

6. The method of claim 1 wherein said step of introducing comprises introducing said Me metal in a generally axial location of said plasma discharge.

7. The method of claim 1 wherein said step of introducing comprises the step of introducing a cooled probe into said active region and introducing said Me metal through said probe.

8. The method of claim 7 wherein said step of introducing comprises the step of adjusting the position of said probe within said active region thereby to maximize the hydrogen content of said reaction products.

9. A method for making metastable compounds of Me metal, argon and hydrogen, comprising the steps of:

supplying a flow of hydrogen-argon gas mixture through a reactor chamber having a longitudinal axis between an inlet and an outlet;

generating a high frequency plasma discharge in said flow of hydrogen-argon gas mixture by means of a plasmatron of either the inductive type or the capacitive type, said plasma discharge including a higher temperature plasma generating active region, said plasma discharge producing a plasma flow downstream of said active region;

establishing a radially inner zone of substantially zero axial flow of said mixture in relation to axial plasma flow immediately downstream of said active region;

introducing finely powdered Me metal into or near said zone and within said active region at a rate such that said Me metal evaporates in said plasma discharge;

precipitating a solid product resulting from interaction of said Me metal with said plasma; and rapidly cooling said solid product at a rate of at least $10^5$ degrees Centigrade/second.

10. The method of claim 9 wherein said Me metal is selected from the group consisting of beryllium, aluminum and magnesium.

11. The method of claim 9 wherein said powdered Me metal is carried into said zone in a flow of Argon gas.

12. The method of claim 9 further comprising the step of passivating said solid product by exposure of said solid product to hydrogen gas or hydrogen containing fluid.

13. The method of claim 1 wherein said step of establishing a zone comprises the step of swirling said flow upstream of said plasma discharge.

14. The method of claim 1 wherein said cooling step comprises cooling a surface with liquified air or nitrogen gas and directing said reaction products onto said surface.

15. The method of claim 1 wherein said cooling step comprises rotating a cylindrical surface about its central axis, continuously cooling said cylindrical surface with liquified air or nitrogen gas and directing said reaction products onto said cylindrical surface.

16. The method of claim 1 wherein said cooling step comprises accelerating said reaction products to a supersonic flow velocity downstream of said plasma discharge and rapidly expanding the supersonic flow of said reaction products.

17. The method of claim 1 wherein said high frequency plasma discharge is generated by means of a plasmatron of either the inductive type or the capacitive type.

18. The method of claim 9 wherein said cooling step comprises cooling a surface with liquified air or nitrogen gas and directing said reaction products onto said surface.

19. The method of claim 9 wherein said cooling step comprises rotating a cylindrical surface about its central axis, continuously cooling said cylindrical surface with liquified air or nitrogen gas and directing said reaction products onto said cylindrical surface.

20. The method of claim 9 wherein said cooling step comprises accelerating said reaction products to a supersonic flow velocity downstream of said plasma discharge and rapidly expanding the supersonic flow of said reaction products.

21. The method of claim 9 wherein said step of establishing a zone comprises the step of swirling said flow upstream of said plasma discharge.

22. A method for making metastable compounds of an Me metal, argon and hydrogen, comprising the steps of:

supplying a flow of hydrogen-argon gas mixture through a reactor chamber having a longitudinal axis between an inlet and an outlet;

generating a high frequency plasma discharge in said flow of hydrogen-argon gas mixture by means of a high frequency plasmatron of either the inductive type or the capacitive type, said plasma discharge including a higher temperature plasma generating active region, there being a lower temperature plasma flow downstream of said plasma discharge;

swirling said flow upstream of said plasma discharge for establishing a radially inner zone of substantially zero axial flow of said mixture in relation to radially outer axial flow of said mixture within said active region of said plasma discharge;

introducing finely powdered Me metal into or near said zone and within said active region at a rate such that said Me metal evaporates in said plasma discharge;

precipitating a solid product resulting from interaction of said Me metal with said plasma;

rapidly cooling said solid product at a rate of at least $10^5$ degrees Centigrade/second by contact with a surface cooled by liquified air or nitrogen gas; and passivating said solid product by exposure to hydrogen or a hydrogen containing compound.

* * * * *